Patented Aug. 12, 1952

2,606,899

UNITED STATES PATENT OFFICE 2,606,899

PREPARATION OF ADENOSINETRIPHOSPHORIC ACID AND ITS SALT

Carl V. Smythe, Moorestown, N. J., and Leslie A. Robb, Philadelphia, Pa., assignors to Röhm & Haas Company, Philadelphia, Pa., a corporation of Delaware No Drawing. Application July 2, 1948,
Serial No. 36,808

6 Claims. (Cl. 260—211.5)

This invention concerns the preparation of pure adenosinetriphosphates. It deals particularly with procedural steps by which adenosinetriphosphoric acid and its salts are obtained in pure, stable form. It is further directed to steps of purification and isolation whereby a dry, solid, stable form of sodium adenosinetriphosphate is prepared.

Adenosine from muscle and from yeast has been converted with both organic and inorganic phosphates to adenosinephosphates, including adenosine-5-monophosphate and adenosinepolyphosphates. In products thus prepared there have been present adenosinetriphosphoric acid and the sodium salt thereof. Previously used methods had not, however, permitted the effective isolation of the adenosinetriphosphates in pure, stable form. Such isolation is particularly desirable for application in the field of therapeutics, where, it has been shown, the adenosinephosphates have utility and value. The basis of one particular value of adenosinetriphosphate is its high energy content and its characteristic of quick release of its energy.

The products prepared by prior art procedures are now found to contain other phosphates than adenosinetriphosphate and to contain heavy metal impurities. It is desired to produce adenosinetriphosphoric acid and its salts, particularly the sodium salt, free of the materials commonly accompanying them and to prepare sodium adenosinetriphosphate in a dry, stable form which is ready for use without more than the conventional steps of preparing and sterilizing solutions thereof.

As is well recognized, therapeutic products should be of the highest degree of purity obtainable in order that results may be controlled and reproduced. Furthermore, it is necessary to avoid the indeterminate and toxic effects of impurities in variable amounts. These factors are of especial significance here since the energy level and the quick release of energy depend upon the adenosinetriphosphate content and phosphate content other than that of adenosinetriphosphate may interfere with its effective utilization.

In the preparation of adenosinephosphates it has been proposed to take as starting materials previously isolated adenosine or yeast nucleic acids hydrolyzed to yield adenosine and treat the starting material with soluble inorganic phosphate and/or with an organic phosphate, such as sugar phosphate or glycerophosphates in the presence of fermenting yeast. The yeast acts upon sugars or sugar derivatives which are added from time to time as fermentation proceeds. The enzyme system of the yeast causes phosphorylation of the adenosine. In this way adenosinephosphates and adenosinepolyphosphates, including the triphosphate, are formed.

The action of the yeast is halted by a step such as rapid heating followed by cooling or by chemical treatment, such as addition of trichloroacetic acid. The solids of the reaction system are separated at this point. The filtrate obtained contains adenosinephosphate, adenosinepolyphosphates, and other substances including sugar phosphates and the like. At this point the solution has usually been treated with a salt of an alkaline earth, such as calcium or barium. This causes precipitation of organic polyphosphates and inorganic phosphates as alkaline earth salts along with some extraneous and contaminating materials. This precipitate is separated and digested with dilute sulfuric acid to yield an insoluble alkaline earth sulfate and a solution of crude adenosinepolyphosphoric acids. Neutralization of these, as with sodium or potassium hydroxides or carbonates, yields the alkali salts of the crude adenosinepolyphosphoric acids. The salts thus obtained are no purer than the crude acids from which they are made. They contain varying amounts of materials other than the desired adenosinetriphosphate, being contaminated with other adenosinephosphates including diadenosinetetraphosphate, hexosephosphate, and the like together with other materials, of which the heavy metal impurities are particularly undesirable.

A partial purification of the crude adenosinepolyphosphates may also be obtained through separation of the adenosinepolyphosphoric acids as such, somewhat contaminated with other materials which may be carried down by them, by adding to a solution containing them a water-miscible organic solvent, such as methanol, ethanol, or acetone, thus precipitating the free acids as solids. This step separates to a considerable extent the alcohol-insoluble organic phosphates from the inorganic phosphates and the alcohol-soluble phosphates, such as the sugar phosphates. These steps by themselves do not, however, give a product of the purity now required.

It has also been suggested that the adenosinephosphates be concentrated or separated through heavy metal salts, such as lead, silver, or mercury instead of through the alkaline earth salts described above. Nevertheless, the suggestions of the prior art have not provided the pure adenosinetriphosphates now required. The difficulties and inefficiencies of the prior art, it is now found, can be avoided or overcome through the present discoveries.

We have found that the crude product, which is obtained by phosphorylation of adenosine with an inorganic phosphate in the presence of fermenting yeast, separation of the phosphorylated adenosine products through the alkaline earth salts thereof, and conversion of these salts to adenosinepolyphosphoric acids yields pure adenosinetriphosphate through the exercise of two procedural operations. These two operations may be performed in optional order and at optional stages in conjunction with the known procedure of phosphorylation of adenosine and separation of alkaline earth salts. These two major operations are (1) the removal of heavy metal contaminants and (2) the isolation of adenosinetriphosphate through its silver salt. As a further improvement, we have now found an improved method for separating a well defined, structurally determinate sodium salt of pure adenosinetriphosphoric acid.

The isolation of adenosinetriphosphoric acid is accomplished through its precipitation from the crude adenosinepolyphosphates in the form of its silver salt. For this purpose the crude adenosinepolyphosphoric acids obtained through their concentration as alkaline earth salts or soluble salts of these crude adenosinepolyphosphoric acids are dissolved in water, a 5% to 10% solution being satisfactory. The solution is adjusted to a pH of about 1.5, a range of 1 to 2 being generally satisfactory and necessary for the success of the separation here desired. A soluble silver salt, such as the nitrate, is added until precipitation is complete. The resulting precipitate is separated and washed.

The above operations are performed with solutions maintained at about 0° to 10° C. It may be noted here that, when solutions containing adenosinepolyphosphates are acidic, it is highly desirable that they be maintained at a low temperature to prevent hydrolysis, thus increasing yields. Temperatures below 10° C. and above freezing of the acid solution are thus preferred not only for the operations in which acid is present but also for the other procedural steps which are performed in conjunction therewith.

For adjusting the acidity of the solution there may be used dilute nitric acid, particularly when a silver nitrate solution is used as the precipitant. After the precipitate has formed, its solubility may be lessened by addition of a water-soluble organic solvent, such as a lower aliphatic alcohol, to the reaction mixture. The precipitate may be coagulated by mechanical action and by standing. It may then be readily separated by filtration or centrifugation. A convenient method of washing the silver salt is by suspending it in a 25% aqueous alcohol solution.

The silver adenosinetriphosphate is converted to a soluble adenosinetriphosphate by metathesis with an alkali chloride. For this purpose the silver adenosinetriphosphate is suspended in excess of a 2% to 8% solution of sodium chloride, for example, in the cold. After silver chloride has formed, it is allowed to coagulate and is then separated. Filtration or centrifugation may be used here and the precipitate washed with dilute sodium chloride solution. The pH of the filtrate is adjusted to a value of 7 with the temperature of the solution maintained near zero degrees centigrade.

To this solution is added a water-soluble, volatile, organic solvent, such as methanol or ethanol. With about three to seven volumes of the solvent per volume of the solution the sodium salt is thrown out of solution. It is separated, washed with alcohol and, if desired, with ether, and dried.

This salt is of considerably better purity than the crude adenosinepolyphosphate from which it is obtained. When an adenosinepolyphosphate obtained through the alkaline earth salt is used as the starting material for precipitation with silver, purities change from the usual 50% to 65% of adenosinetriphosphate for this starting material to 85% to 90% for the product obtained therefrom as above. While this is a notable improvement, the product is still not pure enough for the purposes of the present invention.

The second type of operation which has been proved effective in the preparation of pure adenosinetriphosphates comprises treating a soluble salt of adenosinetriphosphoric acid with a phosphate buffer solution at pH between 8.5 and 11. The pH range of 9.0 to 9.4 is particularly effective. A solution containing the adenosinepolyphosphates or the triphosphate contaminated with heavy metals is adjusted to the pH range specified, alkali phosphate is added to give a molar concentration from about 0.2 to 0.8 within the above pH ranges, and the solution is allowed to stand in the cold. Temperatures below room temperature to 0° C. are suitable. A precipitate forms and is separated by filtration or, better, by centrifugation.

This procedure for removing heavy metals may be applied to the adenosinetriphosphate obtained from the separation through the silver salt. It is not essential, however, that it be performed at that stage. It may be applied to the solution obtained after the yeast cells have been removed following the phosphorylation step. In this case the pH of the filtrate is adjusted to the range specified above and alkali phosphate is added to bring the concentration thereof to the prescribed level. The precipitate which then forms is separated and the other procedural steps followed to give the pure product required.

On the other hand, the phosphate buffer treatment may be applied to the product obtained from decomposition of the crude barium salt. Here the acidic solution may be taken or the crude acid separated and dissolved in water, the pH is adjusted to mild alkalinity, and phosphate buffer is added. The heavy metal impurities are removed in the precipitate which forms.

Again, the steps for removing these impurities may be applied directly to the sodium chloride solution containing sodium adenosinetriphosphate as obtained from the purification through the silver salt. After adjustment of pH and addition of alkali phosphate, the heavy metals are removed in the precipitate which forms.

The separation of adenosinetriphosphate from the buffer solution is best accomplished through acidifying the solution in the cold with a strong mineral acid to a pH between 1 and 2 and adding a water-soluble organic solvent such as methanol, ethanol, isopropanol, or acetone. The free acid is precipitated and can readily be separated.

The free acid, if obtained from the crude products, may be further purified by means of the procedures related above. If the acid is obtained in steps subsequent to the isolation of the silver adenosinetriphosphate, it is, of course, a quite pure product and for practical use needs only conversion to its salts by neutralization with a base of the desired metal.

The acid is converted to a pure, dry, stable sodium salt, for instance, by dissolving the acid in water to give a 3% to 10% solution, neutralizing it with sodium hydroxide or sodium carbonate, adding to the solution of the thus formed sodium adenosinetriphosphate sodium chloride in an amount which is 1% to 5% of the weight of the solution. Then there is added to the solution of sodium salts two to seven volumes of a water-soluble, inert, readily volatile, organic solvent, such as methanol, ethanol, or acetone, to cause precipitation of sodium adenosinetriphosphate. This is formed under these conditions as a finely divided solid which is readily separable from the solution and can be dried.

An alternative method for separating sodium adenosinetriphosphate in a solid form and avoiding the oily, gummy products which are prone to form is through freezing of the solution and evaporation in vacuo from the frozen state.

The solid product, when dried at 20° to 50° C. over calcium chloride or soluble anhydrite, corresponds in composition to tetrasodium adenosinetriphosphate trihydrate. The ratio of total phosphorus to labile phosphorus to nitrogen shows that the product obtained after performance of the steps detailed above is the true triphosphate. The trihydrate is a stable, white, water-soluble salt. When it is heated at 100° C., it loses three molecules of water per mole of salt. Both the trihydrate and the anhydrous form of the pure compound are particularly desirable as they do not change in composition and are satisfactory for use after long storage.

Further details are presented in the following illustrative examples, in which is related the preparation of sodium adenosinetriphosphate starting with nucleic acid and inorganic phosphate and proceeding through the various steps both old and new which have been found to yield a pure, stable product.

There were charged to a kettle 36 kg. of brewer's yeast filter cake, 36 liters of water, and 6 liters of toluene. These materials were mixed by stirring.

A solution of monosodium phosphate was prepared by dissolving 1.77 kg. of this salt in 7.5 liters of water. This solution was added to the kettle containing the suspension of yeast and mixed therewith.

There was separately prepared an adenosine solution which was also added to the charge in the kettle. This solution was prepared by hydrolyzing 2.52 kg. of nucleic acid in an ammonium hydroxide solution formed from 2.02 liters of strong ammonia water (28%) and 10.58 liters of water.

There were then added to the kettle 1.5 liters of an aqueous solution containing 40% of glucose monohydrate, a solution of 27 grams of fructose diphosphate dissolved in one liter of water, a solution of 135 grams of magnesium sulfate heptahydrate in one liter of water, and 26 liters of water. The batch was stirred and maintained at 36° C. Air was blown into the charge at the rate of 3,500 liters per hour. Fermentation occurred and was actively maintained by the addition of 0.6 liter portions of aqueous 40% glucose monohydrate solution at the 30, 60, 90, and 105 minute periods of fermentation. During this time samples were withdrawn and analyzed for their inorganic phosphate content. The inorganic phosphate was consumed at a linear rate for about two hours, at which time it was found that there was a definite decrease in the rate of consumption of inorganic phosphate.

The reaction mixture was then cooled as rapidly as possible to 0° C. Thereupon, 11.8 kg. of trichloroacetic acid in a saturated aqueous solution was added and stirred into the reaction mixture, which was left standing at 0° C. for about 16 hours. The insoluble material was then separated on a filter and washed with a cold aqueous solution containing 5% of trichloroacetic acid. The washings were added to the filtrate.

A solution of sodium hydroxide was mixed with the filtrate until the pH of the resulting solution was 8.5. (Ammonium hydroxide solution may advantageously be used at this point in place of the sodium hydroxide.) Thereto was added an aqueous solution containing 50% of barium acetate until a precipitate was no longer formed, about 18 kg. of the solution being thus required. During the precipitation the temperature of the reaction mixture was between 0° and 3° C. The mixture was stirred for several hours and then filtered. The precipitate was washed with a little of a 1% barium acetate solution.

The filter cake, amounting to 12.7 kg. was suspended in 5 liters of 10% sulfuric acid solution cooled to 0° C. and about 0.65 liter of a 24% sulfuric acid solution slowly added to complete the precipitation of barium sulfate, which was separated by filtration. Addition of five volumes of methanol per volume of filtrate caused the precipitation of crude adenosinepolyphosphoric acids, which were separated by filtration. The nitrogen, the total phosphorus, and the labile phosphorus analyses of this product indicated a content of about 66% of adenosinetriphosphoric acid.

This acid was dissolved in water to give an 8% solution. This was held at 0° C. and the pH thereof adjusted to 1.45 with dilute nitric acid. A dilute solution of silver nitrate was slowly added until precipitation no longer took place. Methanol was then added to decrease the solubility of the silver precipitate. The precipitate was separated by centrifuging the suspension and was washed with methanol. The silver precipitate was mixed with three times its weight of a 4% sodium chloride solution. In about an hour the silver chloride which had formed was coagulated and was separated by centrifuging. The precipitate was washed with a 4% sodium chloride solution. The filtrate and washings were combined and brought to a pH of 7 with a little sodium hydroxide solution. Then, three and a half volumes of methanol were mixed with the neutral solution. During all these operations the solutions were held at temperatures near 0° C. After the elapse of several hours the precipitate which had formed was filtered off.

A 10% solution thereof was made in cold water and an equal volume of a 0.4 molar solution of sodium phosphate at a pH of 9.2 was mixed therewith. In about 30 minutes the precipitate which had been forming began to settle. It was removed by centrifuging. The clear solution was treated with hydrochloric acid until a pH of 1.5 was reached. The acidified solution was mixed with five volumes of methanol to cause precipitation of adenosinetriphosphoric acid. The acid was separated by centrifuging and was washed with 85% methanol.

The acid was dissolved in water and neutralized with an 8% sodium hydroxide solution. The neutral solution was adjusted to a solids content of 6% and mixed with an equal volume of a 3% sodium chloride solution. The solution was then treated with four times its volume of methanol and left standing in the cold for several hours. The sodium salt was precipitated and separated by centrifuging. The product was washed with methanol and ether and then dried. It corresponded by analysis to the tetrasodium adenosinetriphosphate trihydrate. The yield of dry product was 147 grams of pure material.

When the trihydrate was heated at 100° C. in vacuo, it lost three molecules of water per mole. Both the trihydrate and the anhydrous salt therefrom are stable upon storage. They readily dissolve in water and in aqueous salt solutions to give clear solutions which can be sterilized by filtering through a Zeiss filter. The pH of solutions of sodium adenosinetriphosphate is 7.0 to 7.1.

The direct utilization of the sodium salts which become available through the improvements provided by this invention is distinctly advantageous. These salts avoid the inconvenience of neutralizing a solution of adenosinetriphosphoric acid. They avoid the difficulties of attempting to make use of barium salts which are toxic and which must be so converted as to eliminate even traces of barium in products derived therefrom.

Sodium adenosinetriphosphate, when prepared by the aid of the particular steps here used in combination, has a purity and utility not heretofore known. It is well tolerated when given intramuscularly, for example, and may be given intravenously under the proper control.

We claim:

1. In a process for preparing a pure adenosinetriphosphate from adenosine through phosphorylation thereof with an inorganic phosphate in the presence of fermenting yeast, separation of the phosphorylated adenosine products through the insoluble alkaline earth salts thereof, and conversion of these insoluble alkaline earth salts to adenosinepolyphosphoric acids containing heavy metal impurities, the improvements comprising (1) concentrating adenosinetriphosphate by precipitating it from an aqueous solution of said adenosinepolyphosphoric acids at a pH of 1 to 2 in the form of its silver salt by reacting said acids with silver nitrate, reacting said salt with sodium chloride, thereby separating the silver in the form of its chloride, and recovering sodium adenosinetriphosphate therefrom, and (2) dissolving a sodium adenosinetriphosphate containing heavy metal impurities in a sodium phosphate buffer solution at a molar concentration between 0.2 and 0.8 and at a pH of 8.5 to 11, precipitating in said buffer solution said heavy metal impurities, separating the precipitate containing said impurities from the solution, acidifying and recovering adenosinetriphosphoric acid from the solution free of said impurities.

2. In a process for preparing a pure adenosinetriphosphate from adenosine through phosphorylation thereof with an inorganic phosphate in the presence of fermenting yeast, separation of the phosphorylated adenosine products through the insoluble barium salts thereof, and conversion of these insoluble barium salts to adenosinepolyphosphoric acids containing heavy metal impurities, the improvements comprising (1) concentrating adenosinetriphosphate by precipitating it in the form of its silver salt by reacting with silver nitrate in solution at a pH of 1 to 2 and a temperature below 10° C., reacting said salt with sodium chloride, thereby separating the silver in the form of its chloride, and recovering sodium adenosinetriphosphate therefrom, (2) dissolving a sodium adenosinetriphosphate containing heavy metal impurities in a sodium phosphate buffer solution at a molar concentration between 0.2 and 0.8 and at a pH of 8.5 to 11, precipitating in said buffer solution said heavy metal impurities, separating the precipitate containing said impurities from the solution, acidifying the solution with a strong inorganic acid, and recovering adenosinetriphosphoric acid from the acidified solution free of said impurities, and (3) forming and isolating sodium adenosinetriphosphate by neutralizing said acid with a sodium base in aqueous solution, adding sodium chloride thereto, treating the resulting solution with three to seven times its volume of a saturated water-soluble monohydric aliphatic alcohol, thereby precipitating sodium adenosinetriphosphate, and separating this precipitated compound.

3. In a process for preparing a pure adenosinetriphosphate from adenosine through phosphorylation thereof in the presence of fermenting yeast, separation of adenosinepolyphosphates through the barium salts thereof, and conversion of the said salts to adenosinepolyphosphoric acids, the improvements which comprise precipitating silver adenosinetriphosphate from said adenosinepolyphosphoric acids by reacting them at a pH of 1 to 2 with a soluble salt of silver and an inorganic acid, converting said silver adenosinetriphosphate with sodium chloride to silver chloride and sodium adenosinetriphosphate, treating sodium adenosinetriphosphate with a phosphate buffer at a molar concentration of 0.2 and 0.8 and at a pH between 9 and 9.4, thereby precipitating impurities and separating them, recovering adenosinetriphosphoric acid from the buffer solution by acidifying it with a strong acid and adding a water-soluble alcohol thereto, neutralizing the thus purified adenosinetriphosphoric acid with sodium hydroxide solution, thereby forming the sodium salt in solution, adding sodium chloride to the solution of sodium adenosinetriphosphate in an amount of 1% to 5% of the weight of the solution, adding three to seven volumes of a water-soluble, saturated, monohydric, aliphatic alcohol per volume of said solution, thereby precipitating the sodium adenosinetriphosphate, separating this material, and drying it.

4. The process of separating and purifying adenosinetriphosphoric acid from adenosinepolyphosphates containing heavy metal impurities which comprises precipitating silver adenosinetriphosphate from an aqueous solution of said crude adenosinepolyphosphates at a pH of 1 to 2 by reacting said crude adenosinepolyphosphates with silver nitrate, separating said silver adenosinetriphosphate, reacting it with sodium chloride solution whereby silver chloride and sodium adenosinetriphosphate solution result, separating the silver chloride, treating the sodium adenosinetriphosphate solution with a sodium phosphate buffer at a molar concentration between 0.2 and 0.8 and between a pH of 8.5 and 11 whereby a precipitate containing heavy metal impurities is formed, separating said precipitate from the solution, acidifying said solution with a strong acid, and separating adenosinetriphosphoric acid therefrom.

5. The process of separating and purifying adenosinetriphosphates from crude adenosinephosphates containing heavy metal impurities which comprises precipitating silver adenosinetriphosphate from an aqueous solution of said crude adenosinephosphates at a pH of 1 to 2 by reacting said solution with a solution of silver nitrate, separating said silver adenosinetriphosphate, reacting it with sodium chloride solution whereby silver chloride and a solution containing sodium adenosinetriphosphate result, separating the silver chloride, treating the sodium adenosinetriphosphate solution with phosphate buffer at a molar concentration from 0.2 to 0.8 and at a pH of 9 to 9.4 whereby a precipitate containing heavy metal impurities is formed, separating said precipitate from the solution, acidifying said solution with a strong acid, adding a water-miscible alcohol thereto whereby adenosinetriphosphoric acid separates, removing said acid, and reacting it with a base to form a salt thereof.

6. The process of preparing pure sodium adenosinetriphosphate which comprises reacting in aqueous solution at a temperature below 10° C. and at a pH of 1 to 2 silver nitrate and adenosinephosphates containing adenosinetriphosphate whereby silver adenosinetriphosphate is precipitated, separating silver adenosinetriphosphate from said solution, reacting it with sodium chloride solution whereby silver chloride and sodium adenosinetriphosphate result, separating out the silver chloride, treating the sodium adenosinetriphosphate in solution with a phosphate buffer at a molar concentration from 0.2 to 0.8 at a pH between 8.5 and 11 whereby a precipitate containing heavy metal impurities is formed, separating said precipitate, acidifying the resultant solution with a strong acid, adding thereto a water-miscible alcohol whereby adenosinetriphosphoric acid is precipitated, separating said acid, neutralizing said acid in aqueous solution to form the sodium salt thereof in solution, adding sodium chloride thereto in an amount of 1% to 5% of the weight of the resulting solution, adding three to seven volumes of a water-soluble, saturated monohydric aliphatic alcohol per volume of the solution, whereby sodium adenosinetriphosphate is precipitated, separating it, and drying it.

CARL V. SMYTHE.
LESLIE A. ROBB.

REFERENCES CITED

The following references are of record in the file of this patent:

UNITED STATES PATENTS

| Number | Name | Date |
|---|---|---|
| 2,342,760 | Schwaneberg | Feb. 29, 1944 |

OTHER REFERENCES

Annual Review of Biochemistry, volume 2 (1933), page 322; volume 10 (1941), page 228; volume 11 (1942), page 212.